United States Patent [19]

Nesheiwat et al.

[11] Patent Number: 5,037,954

[45] Date of Patent: Aug. 6, 1991

[54] METHOD TO RECOVER LIQUIFIED POLY(ARYLENE SULFIDE) WITH SEPARATION AGENT

[75] Inventors: Afif M. Nesheiwat, Madison, N.J.; Rex L. Bobsein, Bartlesville, Okla.; Joseph G. Ceurvorst, Lakewood, Colo.

[73] Assignee: Phillips Petroleum Company, Bartlesville, Okla.

[21] Appl. No.: 457,635

[22] Filed: Dec. 27, 1989

Related U.S. Application Data

[63] Continuation-in-part of Ser. No. 349,561, May 8, 1989, Pat. No. 4,963,651, Continuation-in-part of Ser. No. 349,562, May 8, 1989, pending, which is a continuation-in-part of Ser. No. 224,265, Jul. 25, 1988, abandoned, which is a continuation-in-part of Ser. No. 104,613, Oct. 5, 1987, abandoned.

[51] Int. Cl.$^5$ ............................................. C08G 75/14
[52] U.S. Cl. ...................................... 528/499; 528/388; 528/494; 528/495; 528/497
[58] Field of Search ................ 528/499, 495, 497, 494, 528/388

[56] References Cited

U.S. PATENT DOCUMENTS

| | | | |
|---|---|---|---|
| 3,354,129 | 11/1967 | Edmonds, Jr. et al. | 260/79 |
| 3,793,256 | 2/1974 | Scoggins | 260/79 |
| 3,839,302 | 10/1974 | Miles | 260/79 |
| 3,919,177 | 11/1975 | Campbell | 260/79.1 |
| 3,956,060 | 5/1976 | Scoggins | 159/47 R |
| 4,127,713 | 11/1978 | Campbell | 528/391 |
| 4,321,358 | 3/1982 | Zelinski | 528/388 |
| 4,415,729 | 11/1983 | Scoggins et al. | 528/388 |
| 4,748,231 | 5/1988 | Nesheiwat | 528/486 |

*Primary Examiner*—Harold D. Anderson
*Attorney, Agent, or Firm*—Beverly M. Dollar

[57] ABSTRACT

A method is provided for recovering poly(arylene sulfide) from a mixture comprising a liquid-phase poly(arylene sulfide) and a polar organic compound, wherein the liquid mixture is contacted by an amount of a liquid, vaporized, or mixed phase separation agent at least sufficient to effect or enhance a phase separation of the liguid-phase poly(arylene sulfide) component from the polar organic compound. The poly(arylene sulfide) resins recovered according to this invention generally exhibit uniform particle size and do not tend to adhere to vessel walls during the recovery.

21 Claims, No Drawings

METHOD TO RECOVER LIQUIFIED POLY(ARYLENE SULFIDE) WITH SEPARATION AGENT

CROSS-REFERENCE TO RELATED APPLICATIONS

This application is a continuation-in-part of applications Ser. Nos. 349,561 (U.S. Pat. No. 4,963,651) and 349,562, filed May 8, 1989 pending, which are continuations-in-part of application Ser. No. 224,265, filed July 25, 1988, now abandoned, which is in turn a continuation of application Ser. No. 104,613, filed Oct. 5, 1987, now abandoned.

FIELD OF THE INVENTION

This invention relates to processes for the production of polymers from aromatic compounds. In a broad aspect, this invention relates to processes for the production and recovery of crystalline, semi-crystalline, and amorphous poly(arylene sulfide) polymers.

BACKGROUND OF THE INVENTION

A basic process for the production of crystalline, semi-crystalline, and amorphous poly(arylene sulfide) polymers from polyhalo-substituted aromatic compounds, wherein the halogen atoms attached to ring carbon atoms react with an alkali metal sulfide in the presence of a polar organic compound at an elevated temperature, is generally known in the art. Due to a continually growing attractiveness towards thermoplastic polymeric resins, a great amount of work has been completed which resulted in the disclosure of methods for both batch and continuous operations to produce crystalline, semi-crystalline, and amorphous poly(arylene sulfide)s from polyhaloaromatic compounds having at least two halogen substituents per molecule. Certain processes for producing crystalline, semi-crystalline and amorphous poly(arylene sulfide) resins result in a liquid reaction mixture comprising a liquid-phase polymer and a polar organic compound which can also function as a solvent for the polymer. Certain other processes for producing poly(arylene sulfide) resins result in a slurry reaction mixture comprising a solid-phase polymeric resin dispersed in a polar organic compound. In order for the polymers produced in these processes to be useful in commercial applications, the polymers must first be recovered from the reaction mixture.

One process used for the recovery of crystalline, semi-crystalline, and amorphous poly(arylene sulfide) resins from a reaction mixture is the addition of a liquid functioning as a phase separation agent. This liquid should be soluble in the reaction mixture and a nonsolvent for the polymeric resin. When certain amounts of a separation agent are used to recover the polymer from the liquid mixture, the process results in the recovery of a polymer in the form of a powder. When certain other amounts of a phase separation agent in the form of a liquid are used to recover the polymer from the reaction mixture, the process results in the recovery of a polymer in the form of relatively large, coarse particles. It should be noted, however, that occasionally some of these resin particles agglomerate into large chunks and/or adhere onto the internal walls of the polymerization reactor. Therefore, it is another object of this invention to provide a method for recovering particulate crystalline, semi-crystalline, and amorphous poly(arylene sulfide) resins from a reaction mixture or liquid mixture comprising a liquid-phase poly(arylene sulfide) and a polar organic compound which can also function as a solvent for the polymer, and optionally water, wherein the resulting polymeric particles are uniform in size and do not tend to adhere to each other or to the internal parts of the reaction vessel.

It is yet another object of this invention to provide a method for recovering particulate crystalline, semi-crystalline, and amorphous poly(arylene sulfide) resins from a reaction slurry comprising a solid-phase poly(arylene sulfide) resin dispersed in a polar organic compound or a slurry prepared by slurrying an already formed resin in a polar organic compound, wherein the resulting polymeric particles are uniform in size and do not tend to adhere to each other or to the internal parts of the reaction vessel.

The invention method can be used to increase the bulk density of an already prepared resin or to achieve a higher bulk density through recovery than would normally be achieved by conventional recovery means. While a technique which increases the resin's bulk density could be advantageous to the commercial industry by improving the resin's handling, there are, however, some applications where such a technique would not be the most preferred mode for improving handling procedures. Specifically, in some commercial applications, it is necessary to have the resin in the form of a fine powder. Examples to such commercial applications include, but are not limited to, powder coating, slurry coating and some types of compounding and pultrusion operations.

If a technique were employed which improved handling procedures by increasing the bulk density of the resin, and if these resins were to be employed in a process requiring the polymer to be in the form of a powder, the resulting resin might have to be milled or ground. Therefore, in those applications wherein it is desirable to use resins while in a powder form, it would be advantageous to improve the handling of the respective resins while not increasing their bulk densities.

It is therefore another object of this invention to provide a method of producing particulate crystalline, semi-crystalline and amorphous poly(arylene sulfide) resins in the form of a fine powder. Surprisingly, the powder produced according to the invention method generally has better handling characteristics, for example, is faster filtering than the powdery resins prepared according to conventional methods.

STATEMENT OF THE INVENTION

In accordance with one embodiment of this invention, a method is provided for recovering a particulate crystalline, semi-crystalline, or amorphous poly(arylene sulfide) polymer from a completed polymerization reaction resulting in a liquid reaction mixture comprising a liquid-phase poly(arylene sulfide), a polar organic compound which can also function as a solvent for the polymer, and water. For purposes herein, the term "completed polymerization reaction" is meant to denote that point at which the polymer is recovered, regardless of whether all reactants have been consumed. Specifically, the liquid reaction mixture is contacted by an amount of a liquid or vaporized separation agent, or mixture of liquid and vapor separation agent, at least sufficient to effect a separation between the poly(arylene sulfide) and the polar organic compound which can also function as a solvent. The liquid or vaporized separation agent comprises a liquid, or vaporized liquid which, when in its liquid-phase, is characterized as being (1) soluble in the polar organic compound, and (2) a nonsolvent or a poor solvent for the poly(arylene sulfide), and (3) able to effect or enhance a separation between the liquid-phase polymer and the polar organic compound which can also function as a solvent. A subsequent reduction in the temperature of the reactor contents produces a slurry comprising a particulate crystalline, semi-crystalline, or amorphous poly(arylene sulfide) resin and the polar organic compound which can also function as a solvent for the polymer. The form of the resultant polymeric particles depends on the amount of separation agent and polar organic compound employed. The use of a relatively larger amount of separation agent in relation to the polar organic compound will produce larger, more granular particles. Relatively smaller amounts of separation agent will produce more powdery particles. Moreover, by employing the separation agent at the same or similar temperatures and pressures as those of the reaction mixture, the polymeric particles recovered from the reaction mixture slurry are uniform in size and do not tend to adhere to each other or to the internal parts and walls of the reaction vessel.

In another embodiment, wherein a completed polymerization reaction results in a reaction slurry comprising a particulate poly(arylene sulfide) resin dispersed in a polar organic compound, and water, the particulate resin is substantially liquified to form a liquid mixture. The liquid mixture comprising the substantially liquified poly(arylene sulfide), a polar organic compound, and water, is contacted by an amount of a liquid or vaporized, or mixed separation agent at least sufficient to effect a separation between the liquid-phase poly(arylene sulfide) and the polar organic compound which can also function as a solvent. Subsequent reduction of the temperature of the reactor contents produces a slurry comprising a particulate poly(arylene sulfide) resin. The polymeric particles recovered from the reaction slurry are uniform in size and do not tend to adhere to each other or to the internal parts and walls of the reaction vessel.

In yet another embodiment of this invention, a method is provided for increasing the bulk density of a particulate crystalline, semi-crystalline, or amorphous poly(arylene sulfide) polymer, which method comprises contacting a liquid mixture formed by dissolving or slurrying an already prepared poly(arylene sulfide) resin in a polar organic compound, and if necessary, substantially liquifying the resin, with an effective amount of a liquid or vaporized phase separation agent or a mixture of liquid and vapor separation agent, then subsequently reducing the temperature of the liquid mixture to produce a slurry comprising a particulate poly(arylene sulfide) resin dispersed in the polar organic compound. The polymeric particles recovered from the slurry are uniform in size and have an increased bulk density over those of the starting resin.

In yet another embodiment of this invention, a method is provided for producing a powdery crystalline, semi-crystalline, or amorphous poly(arylene sulfide) polymer having improved handling, which method comprises contacting a liquid mixture comprising a poly(arylene sulfide) resin and a polar organic compound with an amount of a separation agent sufficient to effect a separation between the resin and polar organic compound, but less than that amount necessary to significantly increase the resin's bulk density. The polymeric particles recovered from the mixture are in the form of a powder having improved handling characteristics (e.g., improved filterability) over those of powdery polymers recovered by conventional means.

A more complete appreciation of the invention and many attendant advantages thereof will be readily obtained by reference to the following detailed description.

DETAILED DESCRIPTION OF THE INVENTION

In one embodiment, the process of the present invention is suitable for use in recovering crystalline, semi-crystalline, and amorphous poly(arylene sulfide) resins produced by any method that results in a reaction mixture comprising a liquid-phase poly(arylene sulfide), a polar organic compound which can also function as a solvent for the polymer and, optionally, water.

In another embodiment, the process of this invention is also suitable for use in recovering crystalline, semi-crystalline, and amorphous poly(arylene sulfide) resins produced by any method that results in a reaction slurry comprising a solid-phase poly(arylene sulfide) dispersed in a polar organic compound which can also function as a solvent for the polymer, and water, wherein the particulate resin can be placed into its liquid-phase without degrading the polymer.

Examples of processes that will produce reaction mixtures which can be treated by the process of this invention are those wherein polyhalo-substituted aromatic compounds are reacted with sulfur-containing reactants and a polar organic compound which can also function as a solvent for the polymer, optionally with polymerization modifying compounds, either in batch or continuous operations. Reaction mixtures wherein the components are premixed to form complexes before all of the components are brought together under polymerization conditions can also be used.

Preferably, the arylene sulfide polymers treated by the process of this invention are phenylene sulfide polymers. The process of this invention can be used to recover crystalline, semi-crystalline, and amorphous phenylene sulfide polymers selected from the group comprising poly(phenylene sulfide), poly(phenylene sulfide sulfone), poly(phenylene sulfide ketone), poly(phenylene sulfide diketone), and poly(biphenylene sulfide).

In one embodiment, this invention provides a method for converting a liquid-phase or solid-phase poly(arylene sulfide) polymer in a liquid reaction mixture into relatively large, coarse particles which are uniform in size, are readily separable from the other components of the reaction mixture, and do not tend to adhere to each other or to the internal parts or walls of the polymerization reactor.

In another embodiment, this invention provides a method for preparing a poly(arylene sulfide) resin in the form of a powder having improved handling over powdery poly(arylene sulfide) resins prepared by conventional methods.

Specifically, by contacting the liquid reaction mixture comprising the liquid-phase poly(arylene sulfide) polymer with an amount of a suitable liquid or vaporized separation agent or a mixture of liquid and vapor separation agent at least sufficient to effect a separation between the polar organic compound which can also function as a solvent for the polymer, and the liquid-phase poly(arylene sulfide), a particulate polymer having the improved characteristics described above can be recovered. The particle size of the resultant polymer generally depends upon the amount of separation agent employed.

At the completion of the polymerization reaction, the crystalline, semi-crystalline, or amorphous poly(arylene sulfide) can be present in the polymerization reaction mixture in either a liquid-phase or a solid-phase depending on the polymer and temperature of the reaction mixture. When the completed polymerization reaction results in a liquid reaction mixture comprising a liquid-phase poly(arylene sulfide) and a polar organic compound, the liquid or vaporized, or mixed separation agent can be added without any modification of the mixture. An example of a process of this type includes, but is not limited to, the synthesis of poly(arylene sulfide) resins such as poly(phenylene sulfide) and poly(arylene sulfide sulfone) resins.

However, when the completed polymerization reaction results in a reaction mixture slurry comprising a particulate solid-phase poly(arylene sulfide) resin dispersed in a polar organic compound, the resin must be substantially liquified prior to the addition of the liquid, vaporized, or mixed separation agent. One method of liquifying a particulate crystalline, semi-crystalline, or amorphous poly(arylene sulfide) slurried in a completed polymerization reaction mixture includes, but is not limited to, heating the reaction mixture slurry to an elevated temperature. It is noted, that since the particulate crystalline, semi-crystalline, or amorphous poly(arylene sulfide) is dispersed in a polar organic compound which can also function as a solvent for the resin, the elevated temperature of the subsequent liquification process need not necessarily exceed the melting point of the resin for the crystalline and semi-crystalline resins. Another method of liquifying the particulate crystalline, semi-crystalline, or amorphous poly(arylene sulfide) resin is to add an additional solvent to the reaction slurry. Depending upon the type and amount of solvent being added, it may also be necessary to elevate the temperature of this reaction mixture in order to liquify the particulate polymeric resin. Examples of when a polymer liquification process might be required would include, but are not limited to, the synthesis of poly(arylene sulfide ketone)s and poly(arylene sulfide diketone)s.

The liquid, vaporized, or mixed separation agent suitable for use in the process of this invention can be any one which in its liquid-phase has the following characteristics: (1) soluble in the polar organic compound which can also function as a solvent for the polymer used in the reaction mixture; and (2) a nonsolvent for the poly(arylene sulfide), and (3) able to effect a separation between the liquid-phase polymer and the remaining liquid components of the reaction mixture, or mixture formed by dissolving an already formed poly(arylene sulfide) resin in a polar organic compound. Examples of suitable liquids which can be used as liquid, vaporized or mixed separation agents include, but are not limited to, the following: water; paraffinic hydrocarbons; higher boiling alcohols; higher boiling ethers; and the like, and mixtures thereof. Water or vaporized water (i.e., steam) is the presently preferred separation agent.

In some instances, the polymerization reaction results in an amount of water (a separation agent) being present in the reaction mixture. Depending upon the polymerization process and the poly(arylene sulfide) being synthesized, the amount of water (separation agent) present in a reaction mixture can range from an undetectable amount to an amount which is at least sufficient to effect or enhance a separation between the liquid-phase poly(arylene sulfide) and the polar organic compound which can also function as a solvent for the polymer. If smaller size particles of polymer are desired, the amount of water may be sufficient to achieve the desired product. Under these circumstances, it will not be necessary to add any separation agent, because the separation agent is already present in sufficient quantities. If the product is desired to be in the form of a powder, it might be necessary in some cases to add additional polar organic compound. However, in order to recover poly(arylene sulfide) resins having greater particle size, it is generally necessary to add an additional amount of a separation agent.

In general, the amount of liquid, vaporized, or mixed separation agent required to be added is affected by (1) the amount of separation agent already present in the reaction mixture, (2) the amount of poly(arylene sulfide) polymer present in the reaction mixture, (3) the amount of polar organic compound which can also function as a solvent for the polymer which is present in the reaction mixture, (4) the degree of crystallinity exhibited by the poly(arylene sulfide) polymer when in its annealed, solid state, (5) the molecular weight of the poly(arylene sulfide) polymer formed, (6) the presence of any other species in the reaction mixture which can affect separation and (7) the particle size desired for the resulting separated poly(arylene sulfide) polymer. More specifically, relatively larger amounts of separation agent will generally produce relatively larger particle size in the resulting separated poly(arylene sulfide) polymer, relatively more separation agent is required for relatively less crystalline poly(arylene sulfide) polymers, relatively less separation agent is required the more separation agent is already present in the reaction mixture at the end of polymerization and relatively more separation agent is required the more poly(arylene sulfide) polymer and/or polar organic compound which can also function as a solvent for the polymer which are present in the polymerization mixture at the end of polymerization. The presence of modifying agents, such as, for example, alkali metal carboxylates, can reduce the amount of separation agent needed to recover the polymer particles. One skilled in the art can readily determine the amount of liquid, vaporized, or mixed separation agent required based on the particle size desired and the specific polymerization reaction mixture to be treated. For poly(arylene sulfides) such as poly(phenylene sulfide), a semi-crystalline poly(arylene sulfide), prepared under typical polymerization conditions such as those described in U.S. Pat. No. 3,354,129 and U.S. Pat. No. 3,919,177, the molar sum of (1) any separation agent present in the liquid reaction mixture at the completion of the polymerization reaction and (2) the liquid, vaporized or mixed separation agent subsequently added to the liquid reaction mixture, must be at least equal to the moles of poly(arylene sulfide) polymer repeat unit present in the liquid reaction mixture. In general, the molar ratio of the liquid, vaporized, or mixed separation agent to the moles of poly(arylene sulfide) repeat unit present in the liquid reaction mixture ranges from about 0.1:1 to about 100:1, and the molar ratio of the liquid, vaporized, or mixed separation agent to said polar organic compound ranges from about 0.001:1 to about 10:1. Preferably, the molar ratio of the liquid, vaporized, or mixed separation agent to the moles of poly(arylene sulfide) present in the reaction mixture ranges from about 0.5:1 to about 50:1, more preferably, from about 1:1 to about 30:1.

As stated above, the separation agent can be added in liquid form, in vaporized form, or in a mixture of liquid and vapor. It is preferred to add the separation agent at the same or similar temperature and pressure as that of the reaction mixture or mixture formed by dissolving or slurrying an already formed poly(arylene sulfide) resin in a polar organic compound. The addition of the separation agent in this manner prevents the agglomeration of particles on the heating coils or walls of the reactor or mixing vessel.

After a sufficient amount of liquid, vaporized or mixed separation agent has been added to the liquid reaction mixture, such that an effective amount of a separation agent is present, the temperature of the liquid reaction mixture is lowered to the range in which the liquid-phase poly(arylene sulfide) resin solidifies. This transitional temperature differs with the type of polymer involved, and is readily determined by one of ordinary skill in the art. For example, the transitional temperature of a poly(phenylene sulfide) polymer is in the range of about 410° F.±20° F. (210° C.±11° C.). Described in another way, when the temperature of the liquid reaction mixture comprising the liquid-phase poly(phenylene sulfide) is decreased from its polymerization reaction temperature (i.e., from about 425° F. (218° C.) to about 525° F. (274° C.)) to a temperature below the resin's transition temperature, the liquid-phase poly(phenylene sulfide) will begin to solidify.

The polymerization reaction temperature for poly(arylene sulfide sulfone) resins generally ranges from about 160° C. to about 230° C. The poly(arylene sulfide sulfone) resin is generally in a liquid-phase at the completion of the polymerization. The temperature of reaction mixture comprising a liquid-phase poly(arylene sulfide sulfone) resin and polar organic compound must be lowered to below the resin's transitional temperature in order to solidify the poly(arylene sulfide sulfone) resin.

In contrast, poly(phenylene sulfide ketone) resins have a polymerization reaction temperature generally ranging from about 450° F. (232° C.) to about 550° F. (288° C.). As stated earlier, the synthesis of poly(phenylene sulfide ketone) results in a reaction mixture slurry comprising a solid particulate resin dispersed in a polar organic compound which can also function as a solvent for the polymer. To practice this invention, the particulate resin must first be substantially liquified. The presently preferred method of liquifying poly(phenylene sulfide ketone)s is by heating the reaction mixture slurry to a temperature at which the polymer is in a liquid-phase.

After the resin has been substantially liquified and the phase separation agent added, the temperature of the now liquid reaction mixture is lowered to a point below the resin's transitional temperature.

Poly(phenylene sulfide diketone) resins have a reaction temperature generally ranging from 450° F. (232° C.) to about 525° F. (274° C.). As stated earlier, the synthesis of poly(phenylene sulfide diketone) results in a reaction mixture slurry comprising a solid particulate resin dispersed in a polar organic compound. To practice this invention, the solid particulate resin must first be substantially liquified. After the resin has been substantially liquified, the temperature of the now liquid reaction mixture is lowered to a point below the resin's transitional temperature.

In general, the crystalline, semi-crystalline, and amorphous poly(arylene sulfide) polymers treated by the process of this invention are produced by contacting under polymerization conditions a dihaloaromatic compound, such as for example a dihalobenzene, with a sulfur source and a polar organic compound.

For example, the dihalobenzenes which can be employed are often p-dihalo compounds represented by the formula

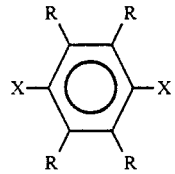

wherein each X is selected from the group comprising chlorine, bromine, and iodine, and each R is selected from the group comprising hydrogen and hydrocarbyl in which the hydrocarbyl can be an alkyl, cycloalkyl, or aryl radical or combination thereof such as alkylaryl, arylalkyl, or the like, wherein the total number of carbon atoms in each molecule is within the range of 6 to about 24, with the proviso that, in at least 50 mole percent of the p-dihalobenzene employed, R is hydrogen. In order to prepare the poly(arylene sulfide sulfone)s useful in this invention, a dihaloaromatic sulfone is generally employed as the dihaloaromatic compound. In order to prepare the poly(arylene sulfide ketone)s or poly(arylene sulfide diketone)s useful in this invention, dihaloaromatic ketones and diketones are generally employed. Optionally, components such as polyhaloaromatic compounds having more than two halogen substituents per molecule, and/or polymerization modifying compounds, such as for example alkali metal carboxylates or lithium halides can also be added. Some of the more common components used in producing these reaction mixtures are listed below.

Some examples of dihaloaromatic compounds which can be employed include, but are not limited to, the following: dihalobenzenes such as p-dichlorobenzene (DCB); p-dibromobenzene; p-diiodobenzene; o-dichlorobenzene; m-dichlorobenzene; m-dibromobenzene; 1-chloro-4-bromobenzene; 1-chloro-4-iodobenzene; 1-chloro-3-bromobenzene; 1-bromo-4-iodobenzene; 2,5-dichlorotoluene; 2,4-dichlorotoluene; 2-chloro-4-iodotoluene; 2,5-dichloro-p-xylene; 1-ethyl-4-isopropyl-2,5-dibromobenzene; 1,2,4,5-tetramethyl-3,6-dichlorobenzene; 1-butyl-4-cyclohexyl-2,5-dibromobenzene; 1-hexyl-3-dodecyl-2,5-dichlorobenzene; 1-hexyl-3-cyclohexyl-2,4-dibromobenzene; 1-octadecyl-2,5-diiodobenzene; 1-phenyl-2-chloro-5-bromobenzene; 1-(p-tolyl)-2,5-dibromobenzene; 1-benzyl-2,5-dichlorobenzene; and 1-octyl-4-(3-methyl-cyclopentyl)-2,5-dichlorobenzene; dihaloaromatic sulfones such as bis(p-chlorophenyl) sulfone; bis(p-bromophenyl) sulfone; bis(o-bromophenyl) sulfone; bis(m-iodophenyl) sulfone; bis(p-iodophenyl) sulfone; p-chlorophenyl p-bromophenyl sulfone; m-bromophenyl o-chlorophenyl sulfone; p-iodophenyl 3-methyl-4-bromophenyl sulfone; p-chlorophenyl-o-bromophenyl sulfone; bis(2-methyl-4-chlorophenyl) sulfone; bis(2,5-diethyl-4-bromophenyl) sulfone; bis(3-isopropyl-4-iodophenyl) sulfone; bis(2,5-dipropyl-4-chlorophenyl) sulfone; bis(2-butyl-4- bromophenyl) sulfone; bis(2,3,5,6-tetramethyl-4-chlorophenyl) sulfone; 2-isobutyl-4-chlorophenyl 3-butyl-4-bromophenyl sulfone; 2-isobutyl-3-chlorophenyl 3-butyl-2-bromophenyl sulfone; 1,4-bis(p-chlorophenylsulfonyl)benzene; 1-methyl-2,4-bis(p-bromophenylsulfonyl)benzene; 2,6-bis(p-bromophenylsulfonyl)naphthalene; 2,6-bis(m-iodophenylsulfonyl)naphthalene; 7-ethyl-1,5-bis(p-iodophenylsulfonyl)naphthalene; 4,4'-bis(p-chlorophenylsulfonyl)biphenyl; bis[p-(p-bromophenylsulfonyl)phenyl] ether; bis[p-(o-chlorophenylsulfonyl)phenyl] ether; bis[p-(p-chlorophenylsulfonyl)phenyl] sulfide; bis[m-(o-chlorophenylsulfonyl)phenyl] sulfide; bis[p-(p-chlorophenylsulfonyl)phenyl] sulfone; bis[p-(p-bromophenylsulfonyl)phenyl)] methane; and 5,5-bis[3-ethyl-4-(p-chlorophenylsulfonyl)phenyl]nonane; and dihalobenzophenones such as 4,4'-dichlorobenzophenone; 3,4'-dichlorobenzophenone; 3,3'-dibromobenzophenone; 4,4'-dibromobenzophenone; 2-chloro-3'-iodobenzophenone; 4,4'-diiodobenzophenone; 2,4'-dichlorobenzophenone; 4,4'-bis(4-chlorobenzoyl)biphenyl; 2,5-bis(4-chlorobenzoyl)thiophene; 1,4-bis(4-chlorobenzoyl)benzene; and the like and mixtures thereof.

Generally, an alkali metal sulfide is employed as the sulfur source. Examples of alkali metal sulfides which can be employed include, but are not limited to, the following: lithium sulfide; sodium sulfide; potassium sulfide; rubidium sulfide; cesium sulfide; and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal hydrosulfide in aqueous solution. Examples of the alkali metal hydroxides which can optionally be employed include, but are not limited to, the following: lithium hydroxide; sodium hydroxide (NaOH); potassium hydroxide; rubidium hydroxide; cesium hydroxide; and mixtures thereof.

Polyhaloaromatic compounds having more than two halogen substituents per molecule can also optionally be employed. These compounds can be represented by the formula

$$R'X'_n$$

wherein each X' is is a halogen, preferably chlorine; n is an integer from 3 to 6; and R' is a polyvalent aromatic radical of valence n which can have up to about 4 methyl substituents. The total number of carbon atoms in R' are within the range of 6 to about 16.

Some specific examples of polyhaloaromatic compounds having more than two halogen substituents per molecule include, but are not limited to, the following: 1,2,3-trichlorobenzene; 1,2,3,5-tetrabromo-benzene; hexachlorobenzene; 1,3,5-trichloro-2,4,6-trimethylbenzene; 2,2',4,4'-tetrachlorobiphenyl; 2,2',6,6'-tetrabromo-3,3',5,5'-tetramethylbiphenyl; 1,2,3,4-tetrachloronaphthalene; 1,2,4-tribromo-6-methylnaphthalene; 2,4,4'-trichlorobenzophenone, 2,4,4'-triiodobenzophenone, 2,4,4'-tribromobenzophenone, and the like, and mixtures thereof.

Various modifying agents can optionally be added such as alkali metal carboxylates or lithium halides. The alkali metal carboxylates which can optionally be employed can be represented by the formula

$$R''CO_2M$$

wherein R" is a hydrocarbyl radical selected from the group comprising alkyl, cycloalkyl, and aryl, and combinations thereof such as alkylaryl, arylalkyl, and the like. The number of carbon atoms in said R" is within the range from 1 to about 20; and M is an alkali metal selected from the group comprising lithium, sodium, potassium, rubidium, and cesium. If desired, the alkali metal carboxylate can also optionally be employed as a hydrate, as a solution, or as a dispersion in water.

Examples of alkali metal carboxylates which can optionally be employed include, but are not limited to, the following: lithium acetate; sodium acetate (NaOAc); potassium acetate; lithium propionate; sodium propionate; lithium 2-methyl-propionate; rubidium butyrate; lithium valerate; sodium valerate; cesium hexanoate; lithium heptanoate; lithium 2-methyloctanoate; potassium dodecanoate; rubidium 4-ethyltetradecanoate; sodium octanoate; sodium hexeicosanoate; lithium cyclohexanecarboxylate; sodium 3-methylcyclopentanecarboxylate; potassium cyclohexylacetate; potassium benzoate; lithium benzoate; sodium benzoate; potassium m-toluate; lithium phenylacetate; sodium 4-phenylcyclohexanecarboxylate; potassium p-tolylacetate; lithium 4-ethylcyclohexylacetate; and the like, and mixtures thereof.

If used, the amount of alkali metal carboxylate added is generally in the range from about 0.05 to about 4, preferably from about 0.1 to about 2 gram-moles of carboxylate per gram-mole of p-dihalobenzene or other dihaloaromatic.

Examples of the lithium halides which can optionally be employed include, but are not limited to, the following: lithium chloride; lithium bromide; lithium iodide; and mixtures thereof.

The polar organic compounds (which can also function as solvents for the polymer) useful in the preparation of polymers recovered by the process of this invention are those which can also function as solvents for both the polyhaloaromatic compounds and the alkali metal sulfides used. Examples of such polar organic compounds which can also function as solvents include, but are not limited to, the following: amides, including lactams; and sulfones. Examples of suitable polar organic compounds which can also function as solvents include hexamethylphosphoramide; tetramethylurea; N,N'ethylene-dipyrrolidone; N-methyl-2-pyrrolidone (NMP); pyrrolidone; 1,3-di-methyl-2-imidazoladinone; caprolactam; N-ethylcaprolactam; sulfolane; N,N-dimethylacetamide; low molecular weight polyamides; and the like. The polar organic compound which can also function as a solvent presently preferred is N-methyl-2-pyrrolidone (NMP).

The particle size and bulk density of an already prepared poly(arylene sulfide) resin can be increased according to this invention. The poly(arylene sulfide) resin which is to be treated to increase the bulk density and particle size should first be redissolved or reslurried in a polar organic compound which can also function as a solvent for the resin. The polar organic compound can be chosen from those listed previously herein. If the poly(arylene sulfide) resin forms a slurry when placed in the polar organic compound, it is desirable to substantially liquify the particulate poly(arylene sulfide) resin. The resin can be substantially liquified according to any method known to one of ordinary skill in the art, such as for example the methods described previously herein.

The solution formed by dissolving the poly(arylene sulfide) resin in the polar organic compound, or the liquid mixture formed after the substantial liquification of the poly(arylene sulfide) resin in the polar organic compound, is then contacted with a sufficient amount of a liquid, vaporized or mixed separation agent, as previously described, and then the temperature of the liquid mixture is slowly reduced to a point below the poly(arylene sulfide) resin's liquid to solid phase transitional temperature. The amount of vaporized separation agent required is that previously described; however, it should be noted that the liquid mixture resulting from placing an already formed poly(arylene sulfide) resin in a polar organic compound will, in most cases, be different from the reaction mixture formed at the completion of the polymerization, due to the absence of components such as unreacted monomer, water present at the beginning of the polymerization or formed during the polymerization, and polymerization modifiers, such as for example alkali metal carboxylates. The amount of separation agent necessary to effect a phase separation agent can be determined readily and without undue experimentation by one of ordinary skill in the art. As a general guideline, the molar ratio of separation agent to polar organic compound will be in the range of about 0.001:1 to 10:1 when the molar ratio of polar organic compound to poly(arylene sulfide) polymer is in the range of about 1:1 to about 30:1.

This invention will be more fully understood from the following examples. These examples are only intended to demonstrate select embodiments of the invention and are in no way intended to limit the scope thereof.

EXAMPLE I

This example demonstrates the recovery of an amorphous poly(arylene sulfide) resin by the novel process of this invention. The amorphous poly(arylene sulfide) used to demonstrate the effectiveness of the invention in this example is poly(phenylene sulfide sulfone) (PPSS).

PPSS resin was prepared by reacting 585.83 grams of bis(p-chlorophenyl) sulfone, 186.68 grams of a 60 weight percent aqueous solution of NaSH, 49 grams of sodium acetate, 214.1 grams of sodium carbonate, 108 ml deionized water and 1562 ml NMP in a nitrogen atmosphere at 200° C. for four hours under a pressure of 180 psig. One thousand ml NMP and 115 ml water were charged to the reactor, with the temperature of the reactor dropping to 185° C. Cooling was continued at the rate of 0.5° C./min to 153° C. at which point 750 ml water was charged to the reactor. This further caused the reactor temperature to drop to 147° C. At 133° C., cooling water was introduced into the cooling coils of the reactor to complete the cooling process. Upon opening the reactor, granular PPSS polymer was observed, with no coating of the reactor coils.

In another run, the run above was performed similarly except that 574.34 g of the bis(p-chlorophenyl) sulfone was used and the 750 ml of water added above was not added in this run, thus the cooling rate of this run was slightly less than that of the above run. At the completion of this run, opening the vessel revealed PPSS resin as a fine material and caked on the coil of the reactor.

EXAMPLE II

This Example demonstrates the recovery of an amorphous poly(arylene sulfide) resin by the novel process of this invention. The amorphous poly(arylene sulfide) used to demonstrate the effectiveness of the invention in this Example is poly(phenylene sulfide sulfone) (PPSS). In the previous example (Example I), a granular product was produced. In this example, a powdery product is produced.

PPSS resin was prepared by reacting 290 grams of bis(p-chlorophenyl) sulfone, 95.41 grams of a 59 weight percent aqueous solution of NaSH, 82 grams of sodium acetate, 106 grams of sodium carbonate, 54 ml water and 850 ml NMP in a nitrogen atmosphere at 200° C. for 3 hours under 150 psig. One thousand ml NMP was added to the reactor, heating was terminated and cooling air was passed through the reactor cooling coil. After cooling, opening the reactor disclosed a foamy, pale green polymer which filtered very fast, yielding a fine, powdery product after drying.

EXAMPLE III

This Example demonstrates the recovery of an amorphous poly(arylene sulfide) resin by the novel process. of this invention. The amorphous poly(arylene sulfide) used to demonstrate the effectiveness of the invention in this Example is poly(phenylene sulfide sulfone) (PPSS).

PPSS resin was prepared by reacting 4.05 moles of bis(p-chlorophenyl) sulfone, 4.00 moles of sodium hydrosulfide (as a 59 weight percent aqueous solution), 4.00 moles of sodium acetate, 10.67 moles of sodium carbonate, 6.00 moles water and 16.00 moles of N-methyl-2-pyrrolidone (NMP) at 200° C. for 3 hours. At the end of the three hour reaction time, 1200 ml NMP and 200 ml water were added to the reactor, followed by cooling and recovery of the polymer product, which was in the form of medium to large granular particles. This resin is hereinafter referred to as Resin 6A.

The preparation of Resin 6A was repeated except that, at the end of the three hour reaction time, 1200 ml NMP only, (no water) was added to the reactor. In this case, the polymer was recovered in the form of a fine powder. This resin is hereinafter referred to as Resin 6B.

The preparation of Resin 6B was repeated. In this case, about 23 weight percent of the product was in the form of fine powder and about 77 weight percent was in the form of granular particles. This resin is hereinafter referred to as Resin 6C.

A comparison of Resins 6B and 6C and the conditions used in their preparation indicates that the amount of NMP added at the end of the three hour reaction time is approximately the lower limit of the amount that can be added under these conditions to produce the powder product form, with lower amounts leading to the granular particle product form.

EXAMPLE IV

This Example demonstrates the recovery of an amorphous poly(arylene sulfide) resin by the novel process of this invention. The amorphous poly(arylene sulfide) used to demonstrate the effectiveness of the invention in this Example is poly(phenylene sulfide sulfone) (PPSS).

Using the general polymerization procedure outlined in Example III, PPSS resin was prepared by reacting 2.02 moles of bis(p-chlorophenyl) sulfone, 2.00 moles of sodium hydrosulfide (as a 59 weight percent aqueous solution), 2.00 moles of sodium acetate, 2.00 moles of sodium hydroxide, 12.67 moles water and 16.00 moles of N-methyl-2-pyrrolidone (NMP) at 200° C. for 3 hours. At the end of the three hour reaction time, 1200 ml NMP and 200 ml water were added to the reactor, followed by cooling and recovery of the polymer product, which was in the form to small to medium granular particles. This resin is hereinafter referred to as Resin 7A.

The preparation of Resin 7A was repeated except that, at the end of the three hour reaction time, 1546 ml NMP alone, (no water) was added to the reactor. In this case, the polymer was recovered in the form of a fine, but still granular particles. This resin is hereinafter referred to as Resin 7B.

The preparation of Resin 7B was repeated. In this case, the product was in the form of a fine powder. This resin is hereinafter referred to as Resin 7C.

The preparation of Resin 7B was again repeated. In this case, the product was in the form of small granular particles. This resin is hereinafter referred to as Resin 7D.

The preparation of Resin 7B was repeated except that, at the end of the three hour reaction time, 2091 ml NMP was added to the reactor. In this case, the polymer was recovered as a powder. This resin is hereinafter referred to as Resin 7E.

The preparation of Resin 7E was repeated. In this case, the polymer was again recovered as a powder. This resin is hereinafter referred to as Resin 7F.

Comparison of Resins 7B through 7F, inclusive, and the conditions used in their preparation indicates that, under these polymerization conditions, the 1546 ml of NMP added at the end of the three hour reaction time in the preparation of Resins 7B, 7C and 7D is approximately the minimum to be used to produce a powder product form, with greater amounts of added NMP consistently producing the powder form.

While this invention has been described in detail for the purposes of illustration, it is not meant to be limited thereby, but is intended to cover all reasonable changes and modifications thereof.

That which is claimed is:

1. A method of recovering a poly(arylene sulfide sulfone) polymer from a liquid mixture comprising a substantially liquified poly(arylene sulfide sulfone) polymer and a polar organic compound, which method comprises:
   a) contacting said liquid mixture with a separation agent selected from the group consisting of liquid and a mixture of liquid and vapor in an amount sufficient to effect a separation between said polymer and said polar organic compound;
   b) slowly cooling the mixture in order to solidify said polymer; and
   c) recovering said solidified poly(arylene sulfide sulfone) polymer.

2. A method according to claim 1 wherein said liquid mixture results from a polymerization reaction wherein reactants comprising a dihaloaromatic sulfone, an alkali metal sulfide, an alkali metal carboxylate, and a polar organic compound are contacted under suitable polymerization conditions.

3. A method according to claim 2 wherein said separation agent is brought to reactor temperature and pressure prior to contacting said liquid mixture.

4. A method according to claim 1 wherein said poly(arylene sulfide sulfone) is poly(phenylene sulfide sulfone).

5. A method according to claim 1 wherein said polar organic compound is N-methyl-2-pyrrolidone.

6. A method according to claim 2 wherein said reactants further comprise at least one base.

7. A method according to claim 1 wherein said liquid mixture further comprises water.

8. A method according to claim 7 wherein the amount of said water present in said liquid mixture is in the range of 0.1 to 100 moles per one mole of poly(arylene sulfide sulfone) repeat unit.

9. A method according to claim 1 wherein said separation agent is added at about the same temperature, and pressure as that of said liquid mixture.

10. A method according to claim 9 wherein said temperature is in the range of 15° to 250° C.

11. A method according to claim 1 wherein said separation agent is selected from the group consisting of water and a mixture of water and steam.

12. A method according to claim 11 wherein the molar ratio of separation agent to polar organic compound during step b) is in the range of 0.001:1 to 10:1.

13. A method according to claim 1 wherein said slow cooling occurs at a rate of less than 1° C./min.

14. A method according to claim 1 wherein agitation of said mixture is maintained during step b).

15. A method according to claim 1 wherein said recovery of said poly(arylene sulfide sulfone) polymer is accomplished by filtration means.

16. A method according to claim 7 wherein a sufficient amount of said water is present in said liquid mixture in order to effect a separation between said polymer and said polar organic compound.

17. A method according to claim 7 which further comprises adding an additional amount of said polar organic compound in order to maintain the molar ratio of water to polar organic compound in the range of 0.001:1 to 10:1.

18. A method according to claim 11 wherein said recovered poly(arylene sulfide sulfone) polymer is in the form of a fine powder.

19. A method according to claim 17 wherein said recovered poly(arylene sulfide sulfone) polymer is in the form of a fine powder.

20. A method according to claim 16 wherein said recovered poly(arylene sulfide sulfone) polymer is in the form of granular particles.

21. A method according to claim 17 wherein said recovered poly(arylene sulfide sulfone) polymer is in the form of granular particles.

* * * * *

UNITED STATES PATENT AND TRADEMARK OFFICE
CERTIFICATE OF CORRECTION

PATENT NO. : 5,037,954

DATED : August 6, 1991

INVENTOR(S) : Afif M. Nesheiwat et al

It is certified that error appears in the above-identified patent and that said Letters Patent is hereby corrected as shown below:

```
column 14, claim 18, line 1, please delete "11" and insert

--- 16 ---, therefor.
```

Signed and Sealed this

Twenty-fifth Day of May, 1993

Attest:

MICHAEL K. KIRK

Attesting Officer

Acting Commissioner of Patents and Trademarks